United States Patent
Kroder

[11] 3,768,342
[45] Oct. 30, 1973

[54] CONNECTING METAL ELEMENTS AND PRODUCTS THEREOF
[75] Inventor: Ernest A. Kroder, Hellam, Pa.
[73] Assignee: Dentsply Research & Development Corp., Milford, Del.
[22] Filed: Feb. 15, 1972
[21] Appl. No.: 226,559

Related U.S. Application Data
[62] Division of Ser. No. 50,444, June 29, 1970, Pat. No. 3,670,416.

[52] U.S. Cl.................. 76/101 A, 29/95, 29/103 A
[51] Int. Cl........ B21k 21/00, B26d 1/00, B26d 1/12
[58] Field of Search.......................... 76/101, 101 A; 29/95, 96, 103 A, 103

[56] References Cited
UNITED STATES PATENTS
| | | |
|---|---|---|
| 2,852,962 | 9/1958 | Fabish............................... 76/101 A |
| 2,413,989 | 1/1947 | Molner et al...................... 76/101 A |
| 2,603,985 | 7/1952 | Vidmar.............................. 76/101 A |
| 2,334,755 | 11/1943 | Eglinton............................ 76/101 A |
| 1,769,636 | 7/1930 | Fletcher............................ 76/101 A |
| 501,755 | 7/1893 | Bain.................................. 76/101 A |

FOREIGN PATENTS OR APPLICATIONS
| | | |
|---|---|---|
| 616,116 | 1/1949 | Great Britain..................... 76/101 A |
| 278,611 | 10/1927 | Great Britain.......................... 29/95 |
| 476,480 | 5/1929 | Germany................................ 29/95 |

Primary Examiner—Harrison L. Hinson
Attorney—C. Hercus Just

[57] ABSTRACT

A method of connecting metal elements by a resistance welding process to produce a high strength joint and particularly to connect a refractory type preformed carbide head to a shank of a dental bur formed from steel, and the product formed by such method.

6 Claims, 10 Drawing Figures

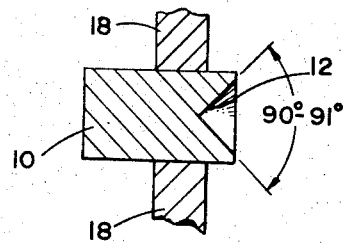
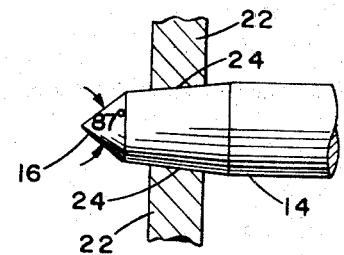
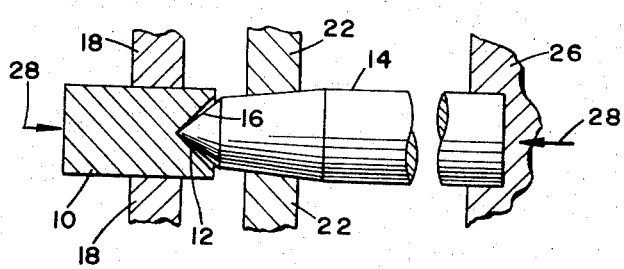
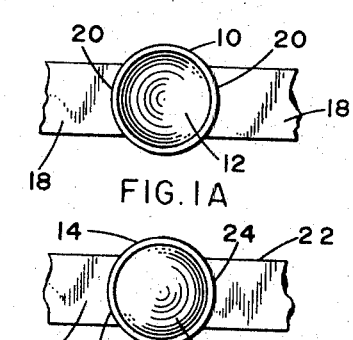
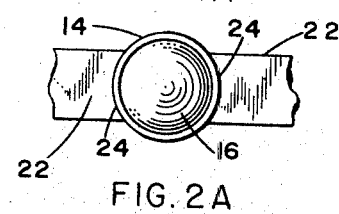
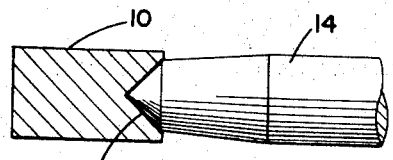
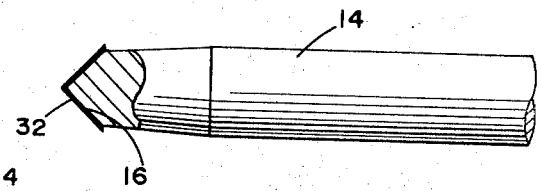
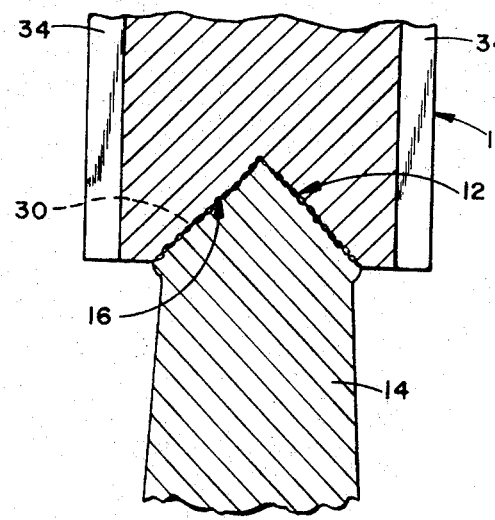
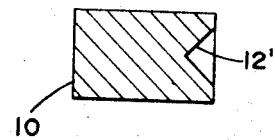
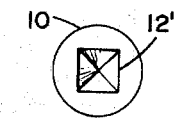

CONNECTING METAL ELEMENTS AND PRODUCTS THEREOF

This application is a division of Ser. No. 50,444 filed June 29, 1970, now U.S. Pat. No. 3,670,416.

BACKGROUND OF THE INVENTION

The present invention, in the broad sense, is directed to the butt joining of two pieces of metal or metallic substances by a resistance heating method and, in particular, a welding process to form a high strength joint between the same. A typical example of such two pieces of metal or metallic substances comprises a preformed carbide element, such as the tip or head of a dental bur comprising a selected metallic carbide formed by sintered powder-metallurgy techniques, and the shank of a dental bur formed from either carbon or stainless steel.

It is well known that cutting heads of various types can be formed by molding metallic carbide powder material by compressing the same in a mold and sintering the particles to form a stable configuration. Similarly, it is common practice to form the shanks of dental burs from conventional carbon or stainless steel by appropriate machining operations. Certain techniques for connecting such pre-formed carbide heads or tips to steel shanks to form dental burs have been proposed heretofore, such as set forth below, and over which improvements are desirable.

A typical example of the prior endeavors to connect carbide cutting heads of dental burs to steel shanks comprises the subject matter of U.S. Pat. No. 2,334,755, in the name of Eglinton. Difficulty has been experienced, however, in regard to effecting a high strength joint between the refractory type carbide cutting heads and such steel shanks shown therein.

In said aforementioned patent, it has been proposed to utilize brazing material between a frusto-conical tip prepared on the end of a shank of a dental bur which is to be connected to the pre-formed carbide head and a conical cavity molded in said head. Brazing material, such as silver solder, is placed within the cavity between the terminal end of the shank of the dental bur and the innermost portion of the conical cavity formed in the carbide head. When heated to a temperature adequate to fuse the brazing material, the theory described in the patent is that the brazing metal will flow between the adjacent abutting surfaces of the prepared end of the shank of the dental bur and the cavity within the pre-formed carbide head. When the brazing material has been melted by placing the assembly in a furnace, the molten material flows into the spaces between the end of the shank of the bur and the cavity in the carbide head, while leaving a void of appreciable size and volume in the innermost end of the conical cavity within the carbide head. Accordingly, only part of areas which could be brazed together are utilized.

Another technique which has been used in the formation of dental burs heretofore has consisted of preforming a carbide tip in the form of a cylindrical slug, for example, and butt-welding one end of the same to a flat surface extending transversely to the axis of the shank of a carbon steel bur. Upon grinding the flutes in the carbide head, said flutes also are formed in the end of the steel shank which is welded to the carbide head. To minimize rusting, the steel shank, prior to welding usually is plated with chromium or the like. However, the grinding of the flutes into the welded end of the steel shank exposes the steel of the shank. Upon being subjected to moisture, such exposed portions of the steel shank tend to rust and this is undesirable. Further, the high heat generated at the interface of the carbide head and bur shank causes the lower melting point materials to melt and bond or fuse to the higher melting point materials, whereby the strength of the resulting joint is a product of the area of the joint multiplied by the joint strength. The heat generated also tends to anneal the steel shank.

SUMMARY OF THE INVENTION

It is the principal object of the present invention to provide a joint of far greater strength than has heretofore been possible between a pre-formed blank, for example, of refractory type metal such as a metallic carbide, and a steel shank which is to support said blank, by resistance welding.

It is another object of the invention to provide a high strength joint between the aforementioned elements while employing a lower total amount of heat than has been necessary heretofore.

A further object of the invention is to provide a high strength welded joint between a carbide pellet and the steel shank to form the basic assembly of a carbide-tipped bur for dental purposes.

Still another object of the invention is to provide a method of connecting a refractory type carbide bur to a steel supporting shank by an improved welding technique resulting in the formation of a welded union between the two members of far greater strength in comparison with the total area of the weldment than has been possible heretofore.

Another object of the invention is to provide complementary conical shaped surfaces on the refractory carbide element and the steel shank referred to above, to provide self-centering of the members incident to being welded together and thereby produce a concentric product, as well as provide means by which a weldment of even thickness and fully coextensive with the adjacent surfaces of the shank and carbide element is produced.

Details of the foregoing objects and of the invention, as well as other objects thereof, are set forth in the following specification and illustrated on the accompanying drawing comprising a part thereof.

DESCRIPTION OF THE DRAWING

FIG. 1 is a fragmentary vertical sectional view of an exemplary refractory type metal element embodying the principles of the invention.

FIG. 1A is a slightly enlarged end view of the elements shown in FIG. 1.

FIG. 2 is a fragmentary side elevation of an exemplary end configuration of a metallic member to be connected to the refractory type metallic element shown in FIG. 1.

FIG. 2A is an end view of the member shown in FIG. 2.

FIG. 3 is a fragmentary, partially sectioned, foreshortened side elevational view of the elements of FIGS. 1 and 2 mounted in contact with each other.

FIG. 4 is a fragmentary, partially sectioned, side elevation of the elements shown in FIG. 3 at the completion of the same being connected by a weldment.

FIG. 5 is a fragmentary side elevation, partly in section, of a prepared end of a metallic element having a different embodiment of connecting means from that shown in FIG. 4 applied to one end thereof.

FIG. 6 is a substantially enlarged exemplary sectional view showing a reproduction of a microphotograph of the final weldment by which the cutting head is connected to the tip of the shank and showing the substantially uniform thickness of the weldment.

FIGS. 7 and 8, respectively, are a longitudinally sectioned view and an end view of a further embodiment of configuration of cavity for the refractory type metal element shown in the preceding figure.

DESCRIPTION OF THE PREFERRED EMBODIMENTS

The present invention pertains to a method of connecting metallic elements together by resistance welding, and the products resulting therefrom, to produce a welded joint of higher strength than has heretofore been possible. While the invention is applicable to the connecting of various types of metallic elements and substances, and especially a refractory type metal to an item of more conventional material such as carbon or stainless steel, the invention especially lends itself to the production of improved cutting and/or grinding tools. Still more specially, the method is highly suitable to produce dental burs of superior concentricity and strength, between a metallic carbide cutting tip and a steel shank connected thereto, than has been possible heretofore.

Accordingly, without specific limitation thereto, a dental bur has been selected as an exemplary product which may be manufactured by the method comprising the present invention, said invention also including the resulting product. With the foregoing in mind, the characteristics of the selected dental bur and the method of forming the same in accordance with the principles of the present invention are described as follows:

Referring to FIG. 1, a refractory type metallic element 10, which specifically comprises a cutting tip or head, is illustrated therein. Specifically, the cutting tip or head shown in the figure comprises a cylindrical blank formed of metallic carbide and having a conical recess in one end which is coaxial therewith. Various other types and shapes of cutting and/or grinding tips or heads for other purposes may be formed by the same technique and employ the present invention to form a resulting product.

Incident to forming the cutting tip or head 10, such as by the aforementioned powder-metallurgy technique, a conical cavity 12 is formed in one end thereof, the axis of the cavity being precisely coaxial with the head 10. As illustrated in FIG. 1, the cavity walls subtend an angle of approximately 90° or 91°. Said angle, however, primarily is illustrative rather than restrictive. Nevertheless, it has been found that this exemplary angle is highly satisfactory for the intended purpose described hereinafter. As in the manufacture of conventional processes for forming cutting tools, and especially those of small dimensions, the cutting tip or head 10 is formed initially as a cylindrical blank and flutes or other formations are ground into the desired surfaces thereof to produce cutting or grinding edges, after connecting the head to one end of the shank.

An exemplary supporting shank 14 which is to be connected to the cutting tip or head 10 is illustrated in FIG. 2. Such shank may, for example, be formed from either carbon steel or stainless steel, or any other appropriate metal or alloy. In accordance with the principles of the present invention, it is preferred that said shank be formed from a metal having a lower melting point than the composition of the preferably refractory metal cutting tip or head 10. The terminal end of the shank 14 is provided with a conical tip 16, said conical tip being coaxial with the shank and opposite surfaces thereof preferably subtend a slightly smaller angle than that of the conical cavity for recess 12 in head 10. The exemplary angle of 87° is illustrated in FIG. 2 but the same also is to be regarded primarily as illustrative rather than restrictive, though practical for the intended purposes.

Referring to FIGS. 1 and 1A, a pair of exemplary welding electrodes 18 are illustrated in diametrical opposition to each other and the same engage opposite sides of the exemplary cutting head 10. In FIG. 1A, it will be seen that the electrodes have concave faces 20 which comprise supporting and positioning surfaces which preferably are complementary to the sidewalls of the head 10 which are engaged by said electrodes. Thus, the electrodes serve the dual purpose of supporting and positioning the head 10 as well as directing current to the head 10 during the welding operation described hereinafter.

In FIGS. 2 and 2A, another pair of welding electrodes 22 are shown in diametrical opposition to each other and in engagement with sides of the shank 14. The electrodes 22 also are provided with concave faces 24 which are complementary preferably in all respects to the sides of the shank 14 which are engaged thereby. Said faces, therefore, comprises supporting and positioning surfaces for the shank incident to connecting the shank 14 to the head 10 in accordance with the welding procedure described hereinafter. The electrodes 18 and 22 described hereinabove are formed from conventional material utilized in electrodes employed in electrical resistance welding techniques.

The conical tip 16 of the shank 14, while not precisely complementary to the cavity or recess 12 of the head 10, nevertheless is reasonably complementary thereto for practical purposes. Incident to connecting the shank 14 to the head 10, the same are aligned by suitable mechanism, not shown, which, for example, supports the pairs of electrodes 18 and 22 and effects movement thereof, together with the head 10 and shank 14 supported thereby, preferably along a common axis coaxial with said head and shank to move the conical tip 16 into the cavity or recess 12. The difference in the angularity of the conical surfaces thereof results in very precise centering of said head 10 in accurate coaxial alignment with shank 14.

The aforementioned engagement of the head 10 with the shank 14 is illustrated in exemplary manner in FIG. 3, in which the shank 14 is interrupted intermediately of its ends to foreshorten the view. The mechanism by which the guided movement of the head 10 and shank 14 is accomplished also includes a pushing member 26, shown in fragmentary manner, by which the shank 14, for example, is moved toward the head 10. Suitable means, represented by the exemplary arrow 28, either moves the head 10 toward the shank or stabilizes the head against movement away from the shank when the latter is forced toward and into engagement therewith.

After the head 10 and shank 14 have been moved into coaxial alignment with each other as illustrated in FIG. 3, electric current is applied to the electrodes 18 and 22, by conventional mechanism, not illustrated, for purposes of effecting a high strength welded connection between the exemplary head 10, which comprises a metallic carbide pellet or blank, for example, and the steel supporting shank 14. The application of welding current to the electrodes 18 and 22 primarily results in the lower melting material of the shank 14, such as carbon steel or stainless steel, fusing at least on the surface thereof even though no appreciable fusion of the metallic carbide head 10 may occur.

Especially in view of the relatively sharply pointed extremity of the conical tip 16 being in engagement with the innermost surface portion of the conical cavity or recess 12 in the head 10, the outer extremity of the conical tip will fuse to a limited depth practically instaneously, before any remaining portion of the tip 16 fuses. Although there is an initially tapered space between the walls of the recess 12 and conical tip 16, pressure applied between the head 10 and shank 14 forces the same firmly together and results in the fused surface material of the extremity of conical tip 16 diffusing into the entire surface of the cavity 12 and this phenomenon also doforms the conical tip 16 sufficiently to conform it to the wells of cavity 12. The fused portion of tip 16 is adequate to form an uninterrupted weldment surface 30 which, though shown in somewhat exaggerated in FIG. 6, is of substantially uniform thickness throughout the entire area of the coextensive surfaces of the conical tip 16 and conical recess 12, thereby providing maximum possible strength between said head and shank because no spaces or gaps exist between said tip and recess.

From the foregoing, therefore, it will be seen that a welded connection 30 of maximum strength is effected between the head 10 and shank 14 by the welded connection 30 which extends uniformly between the entire co-engaging surface portions of the conical tip 16 and recess 12, due to the conforming of the shape of tip 16 to that of recess 12 incident to effecting the weldment 30. Such weldment also is formed while the head 10 and shank 14 are supported by the electrodes 18 and 32 and other portions of the equipment, not shown, in accurate coaxial alignment with each other. Such positioning by said electrodes and other portions of the mechanism is maintained during and after the application of the current. The weldment 30 cools instantly in view of the small size of the bur, after which the electrodes 18 and 22 are released from the head 10 and shank 14 to permit removal of the firmly connected head and shank from the welding equipment. The integrally connected product resulting from the manufacturing method described above is subjected to further finishing operations such as the grinding of flutes 34 or other configurations upon the cutting tip or head 10 in order to provide cutting edges thereon.

A further advantage resulting from the method of manufacturing described above, with respect to dental burs in particular, is the fact that, if desired, the welded head 10 and shank 14 may be subjected to suitable plating operations, especially to render the shank 14 rust resistant, prior to the grinding of the surface of the head 10 to form the flutes 34 and resulting cutting edges thereon. Such grinding of the cutting edges upon the head 10 may occur for the full length thereof without contacting the plated surface of the shank 14, for example, as can be appreciated from FIG. 6.

The resulting product also is precisely concentric and free from an appreciable eccentricity, whereby no final balancing of the product for concentricity is required. This is important especially in the formation of cutting tools operating at high speeds such as dental burs operating at speeds of 200,000 rpm and upwards. Even the slightest eccentricity of the burs under such circumstances is highly detrimental to the bearing of dental handpieces in which the burs are used. Concentricity of the cutting head with respect to the supporting shank also is desirable in other types of cutting tools capable of being formed by the method described hereinabove for purposes of uniting the cutting head with a supporting shank by welding techniques as described.

The welding action described above occurs by the passage of current, for example, from one of the electrodes 18 to one of the electrodes 22. Accordingly, heat initially is generated at the outer extremity of the conical tip 16, and due to maximum resistance offered thereby, thus causes at least the aforementioned surface fusion of the conical tip 16 from the extremity outwardly toward the larger diameter of the tip 16, and causes conformity of tip 16 to the surface of cavity 12 and also effects the uniform thickness of weldment 30. Constant pressure exerted upon the shank 14 results in forming the weldment 30 of substantially uniform thickness throughout the entire extent of the coengaging surfaces thereof.

An added advantage of such technique is that such welding action will prevent gases and impurities from becoming entrapped within the weldment 30 and the pressure exerted between the shank 14 and head 10 will insure positive contact between the walls of the cavity 12 and conical tip 16 at all times. The conical shape of the weldment 30 also provides a bonded surface of greater area between the head 10 and shank 14 than in conventionally welded heads and shanks of cutting tools in which substantially flat abutting surfaces are welded together in accordance with conventional techniques. Accordingly, a welded joint having higher strength than conventional cutting tools of similar type is provided in the products manufactured in accordance with the method described above.

If desired to effect a brazed joint between the head 10 and shank 14, such as by employing a lower temperature than the welding temperatures utilized in the method described above, attention is directed to FIG. 5 in which it will be seen that the conical tip 16 of shank 14 is either coated or plated with a lower melting metal or alloy than that, for example, from which the shank 14 is formed, such as copper. The angle of the conical tip 16 and that of the cavity 12 in head 10 may be substantially the same as that described above. By applying electric current to the head 10 and shank 14 through the use of electrodes 18 and 22, for example, as described above, or by otherwise suitable heating the same, the metal coating 32 will be suitably melted to form a brazed connection as distinguished from a welded connection between said head and shank.

While the preferred shape of the cavity 12 in head 10 and tip 16 of shank 14 is a circular cone, it is also contemplated within the purview of the present invention to use a different configuration of surfaces on the tip 16 and the recess 12, if desired. Referring to FIGS. 7 and 8, it will be seen that the exemplary head 10 is provided with a recess 12', which, for example, comprises a square pyramid. Similarly, the tip 16 of shank 14 which is to be connected thereto will be provided with a complementary pyramidal shape but preferably of a slightly smaller angle than that of recess 12' as in regard to the recess 12 and tip 16 described above with respect to the preceding embodiments. Otherwise, the welding techniques described above with respect to the embodiments shown in FIG. 1–4 and 6 may be used to connect the head and shank together.

From the foregoing, it will be seen that the present invention provides a relatively simple but highly effective method for connecting metal elements together, especially in the cutting tool field and, more particularly, in regard to manufacturing dental burs. The utilization of substantially complementary conical surfaces in a cavity in one element and a tip on another element to be connected to the first element results in the formation of a more extensive welded area than is afforded by flat abutting surfaces which are welded together.

Further, by the utilization of small differences in the angularity of the conical tip with respect to the conical cavity or recess, an initial fusion of the extremity of the conical tip will occur in order to conform the tip closely to the shape of the cavity walls and also form a weldment which extends from the intially melted tip, outwardly to the full extent of all surfaces of the conical cavity in the head member being connected to said tip. Such conical configurations also afford accurate self-alignment of the members with respect to each other to produce precise concentricity in the finished product and thereby substantially eliminate all necessity of final balancing of such product.

While the invention has been described and illustrated in its several preferred embodiments, it should be understood that the invention is not to be limited to the precise details herein illustrated and described since the same may be carried out in other ways failing within the scope of the invention as illustrated and described.

I claim:

1. A method of forming a cutting tool having a cutting head formed from refractory type metal and having a conical recess in one surface thereof, and a steel shank having a conical tip of slightly less angularity than said conical recess, said method comprising the steps of:
   a. positioning said conical tip of said shank coaxially into said recess of said cutting head to center the shank relative thereto,
   b. applying electric welding current respectively to said shank and cutting head to effect fusion at least of the outer surface of said conical tip of said shank, and
   c. pressing said tip and cutting head axially together to conform said fused tip to the surface of said conical recess in said cutting head and thereby diffuse the fused metal into the entire surface of said recess in said head to effect a welded connection of said shank tip to said cutting head over the entire coextensive conical surfaces thereof.

2. The method according to claim 1 including the further step of applying welding electrodes having positioning surfaces respectively to said tool head and to said shank adjacent said conical tip thereof to dispose the conical surfaces of said shank and tool head in coaxial alignment prior to applying said electric welding current thereto.

3. The method according to claim 2 including the further final step of retaining said shank and cutting head in connected position by said electrodes after completion of the welding of the same together to permit cooling of said welded connection sufficiently to stabilize the same.

4. A method of forming a dental bur having a metallic carbide cutting head and a steel supporting shank fixedly connected thereto comprising the steps of:
   a. forming a cutting head in a mold by sintering powdered metallic carbide therein under pressure and providing a conical cavity coaxially therewith in one end thereof,
   b. forming a conical tip on one end of a steel shank, said tip having a slightly smaller angle than said conical cavity in said cutting head,
   c. positioning said conical tip of said shank and conical cavity of said head in axial alignment with each other,
   d. pressing said conical tip into said conical cavity, while applying current to said electrodes, and,
   e. fusing the terminal end of said conical tip of said steel shank while pressing said tip and cavity of said cutting head axially together to cause the fused metal of said tip to diffuse into the surfaces of said cavity over the entire coextensive conical surfaces of said cavity and tip and thereby conform the shape of said tip precisely to said cavity and also form a welded union of substantially uniform thickness uninterruptedly throughout said coextensive conical surface portions of said tip of said shank and conical cavity of said cutting head.

5. The method of forming a dental bur according to claim 4 comprising the further step of applying respectively to said cutting head and supporting shank welding electrodes having positioning surfaces arranged to dispose the conical tip of said shank and conical cavity of said cutting head in axial alignment with each other prior to applying said electric welding current thereto.

6. The method of forming a dental bur according to claim 5 including the further final step of retaining said shank and cutting head in connected position by said electrodes after completion of the welding of the same together to permit cooling of said welded connection sufficiently to stabilize the same.

* * * * *